Oct. 27, 1964 E. A. HARTBAUER 3,154,452
METHOD AND APPARATUS FOR MAKING REINFORCED WEB
Filed Feb. 13, 1959 3 Sheets-Sheet 3

INVENTOR.
ELLSWORTH A. HARTBAUER
BY
Fryer + Johnson
ATTORNEYS.

United States Patent Office 3,154,452
Patented Oct. 27, 1964

3,154,452
METHOD AND APPARATUS FOR MAKING REINFORCED WEB
Ellsworth A. Hartbauer, Concord, Calif., assignor to Crown Zellerbach Corporation, San Francisco, Calif., a corporation of Nevada
Filed Feb. 13, 1959, Ser. No. 793,014
4 Claims. (Cl. 156—178)

This invention relates to a method and machine for fabricating a web of reinforced material by incorporating a pattern of reinforcing strands between two plies of paper-like material bonded to each other and to the strands with an adhesive.

One example of a material that can be fabricated by the machine of the present invention and its use is a gummed tape employed for sealing and strengthening the edges and corners of cartons of merchandise to prevent breakage of the cartons in shipment and handling. Heavy kraft papers lack sufficient strength for some such uses and the use of two layers or webs of such paper with reinforcing strands bonded between them has been considered. The greatest stresses encountered for binding tapes are often in the direction of their width and this gives rise to the necessity of a great many strands of thread-like reinforcing material closely spaced and extending generally crosswise of the tape. Previous attempts to fabricate such material and to arrange the strands in a suitable pattern for inclusion between webs have included the use of shuttles or other reciprocating parts resulting in machines that are cumbersome, slow and inefficient.

It is the object of the present invention to provide a method and apparatus for fabricating a reinforced web of the kind described in which a uniform pattern of reinforcing strands is arranged through the use of rotating rather than reciprocating elements of the machine and included with an adhesive between two rapidly moving webs without the necessity of knotting, weaving or in any way interconnecting the strands to retain their desired arrangement.

A further object of the invention is to provide a machine for arranging a plurality of closely spaced strands for inclusion between two webs in a crossed angular pattern with each strand disposed at a small angle to the transverse direction of the web and in which a plurality of strands may also be included longitudinally of the web.

Further and more specific objects and advantages of the invention are made apparent in the following description wherein reference is made to the accompanying drawings illustrating a machine embodying the present invention.

The present disclosure is of a machine designed for fabricating a tape-like product of about four inches in width which includes between two webs of paper tape a diagonal pattern of crossing strands and six spaced longitudinal strands. It is to be understood, however, that reinforced webs of various and much greater widths can be formed in accordance with the invention disclosed. It is further to be understood that while kraft paper and fiberglass strands are described and have been selected for certain uses, other papers, plastics and various other materials may be substituted for the web material and combined with strands of many siutable reinforcing materials. It is also contemplated that wide webs will be fabricated and later cut to narrow width for the production of tape-like products.

The machine of the present invention feeds two webs from supply rolls toward each other and between pressure or pincher rolls. On the way toward the pincher rolls, at least one of the webs is coated with an adhesive and as both webs enter the nip of and pass between the pincher rolls, thread-like strands are arranged in a pattern and are introduced between them. The pattern includes a plurality of strands layed in diagonal or zig-zag overlapping paths. The means of the present invention for arranging a strand in a zig-zag path without reciprocating parts comprises two rotary members carrying hooks adjacent their peripheries and spaced apart. Between these members, a third rotary member with eyelets adjacent its periphery rotates on a plane perpendicular to the hook members. Strands of reinforcing material are led through the eyelets and laced back and forth over the hooks as the members rotate in timed relationship. This forms a pattern of overlapping diagonal strands which passes immediately off of the hooks and between the webs as they are being adhesively bonded.

Figure 1:
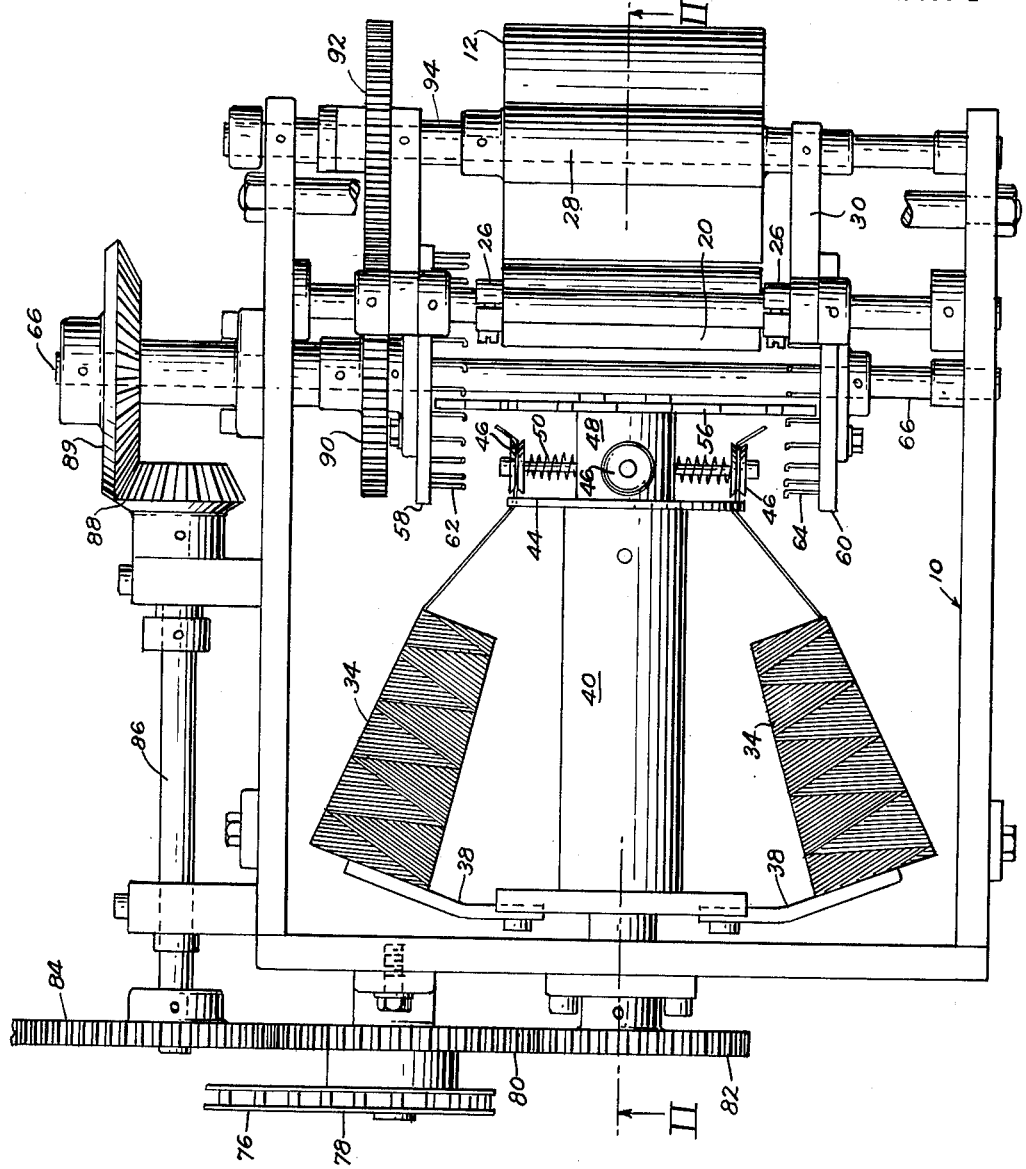
FIG. 1 is a plan view of a machine embodying the present invention.
Figure 2:
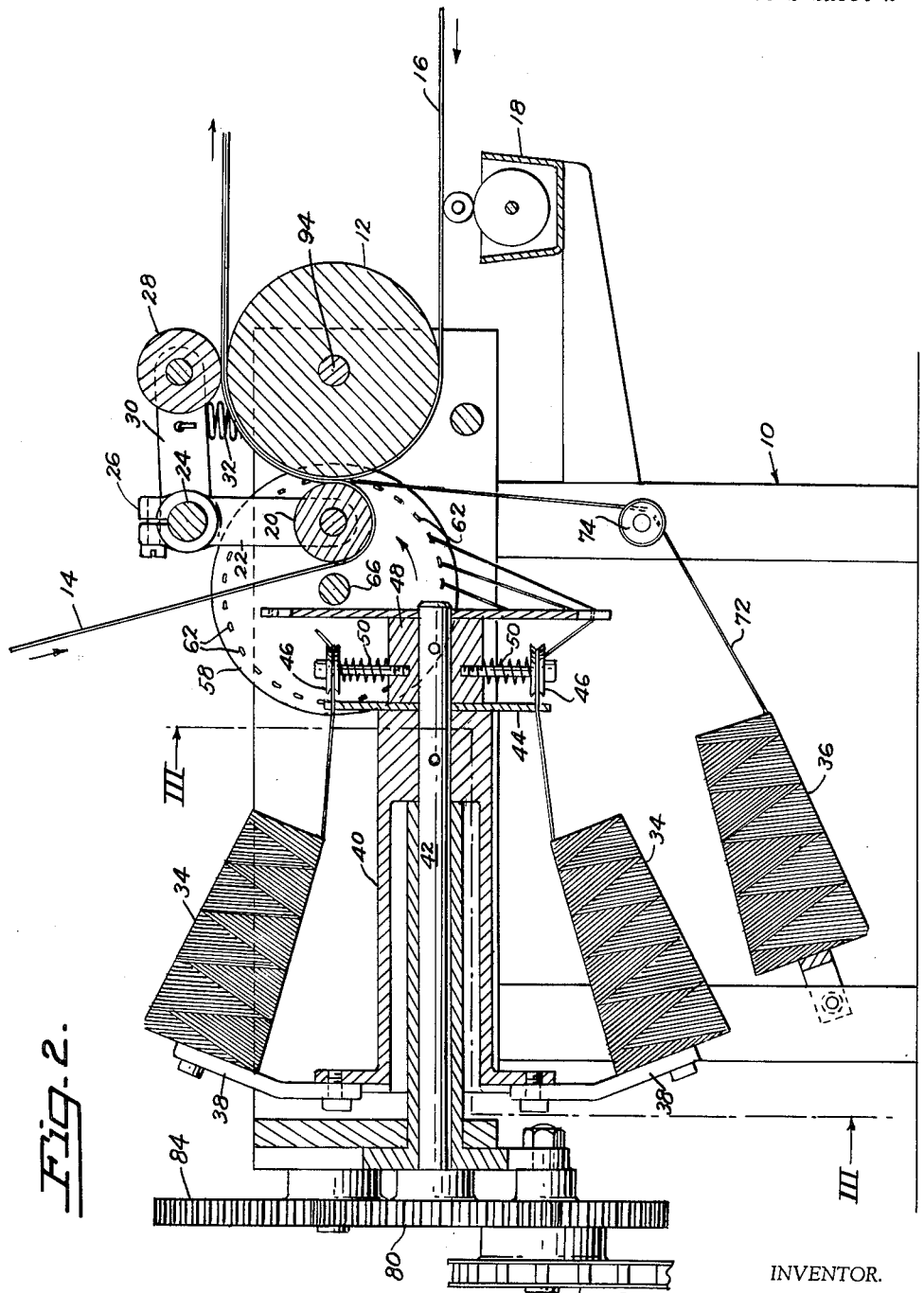
FIG. 2 is a central vertical sectional view taken on the line II—II of FIG. 1.

Referring first to FIGS. 1 and 2 of the drawings, the machine of the present invention is shown as supported on suitable framework generally indicated at 10 and as having a rotatable drum or roller 12 over which two webs of paper or like material are passed. One web is shown at 14 as leading downwardly from a supply roll not illustrated and the other web at 16 as leading inwardly toward the drum 12 from another source of supply. The web 16 is coated with an adhesive substance which may be ony one of many suitable types by an adhesive transfer mechanism schematically illustrated at 18 and is trained directly over the drum 12. The web 14 passes under a pincher roller 20 adjustably supported on links 22 which extend downwardly from a shaft 24 to which they are secured by clamping devices such as illustrated at 26. A pressure roller 28 carried on links 30 loosely mounted on the shaft 24 is urged downwardly as by springs shown at 32 into engagement with the two webs of paper as they pass over the top of the drum 12 toward suitable drying means not shown for drying the adhesive which holds the webs together. One outside surface of the combined webs may be coated with a moisture sensitive adhesive for use in securing it in place on cartons or other objects with which it is to be used.

Figure 3:
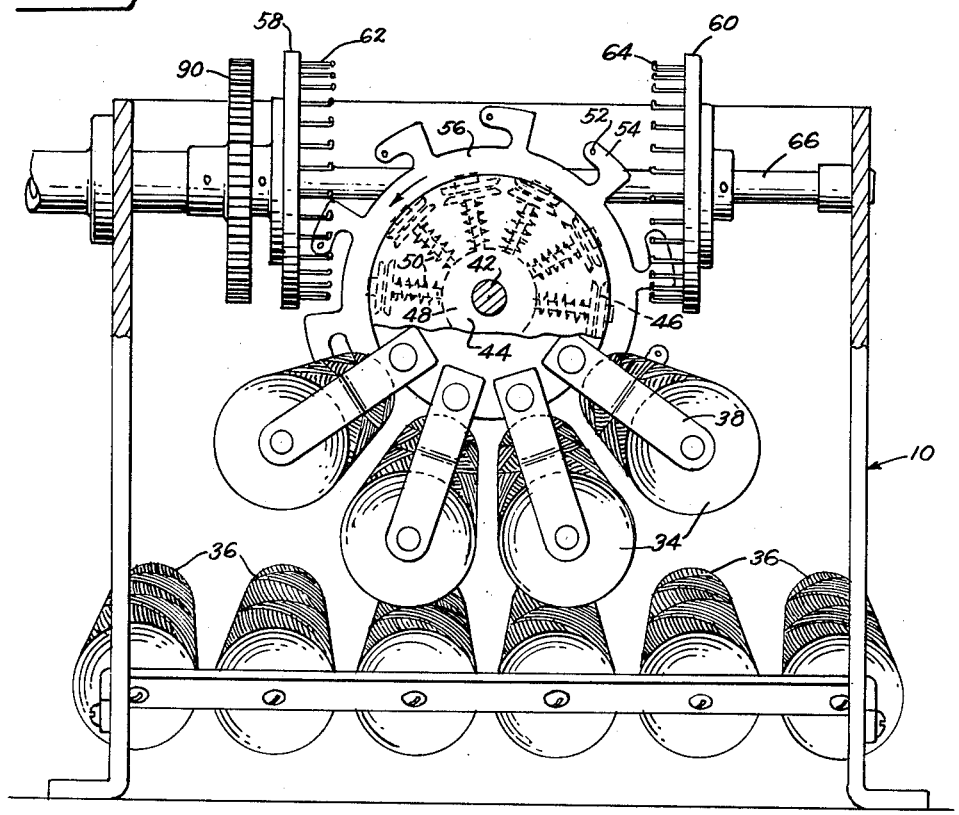
FIG. 3 is a view partially in rear elevation and partially in section taken on the line III—III of FIG. 2.
Figure 4:
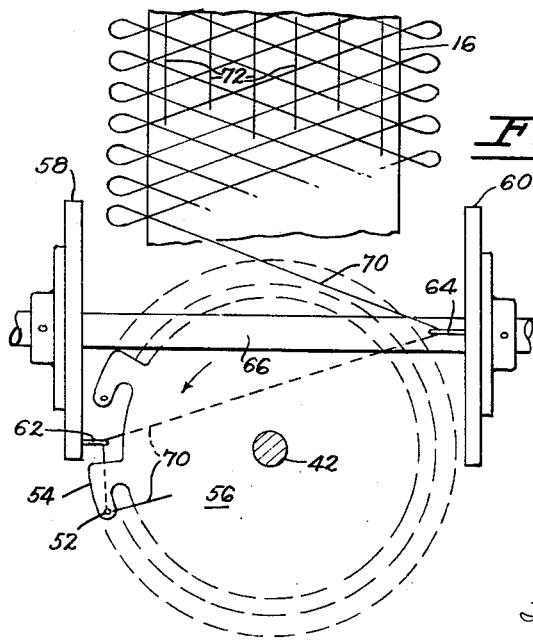
FIG. 4 is a schematic view illustrating the manner in which reinforcing strands are laced between rotating disc-like members to form a desired pattern.

As the webs 14 and 16 are brought together and adhesively secured between the drum 12 and the pincher roll 20, a plurality of reinforcing strands arranged in a desirable pattern which is illustrated in FIG. 4 is fed between them. These strands are carried on two sets of bobbins; one set comprises ten bobbins arranged in a circle and illustrated at 34, and the other set comprises six bobbins arranged in a straight line and illustrated at 36. In FIGS. 1 and 2 of the drawings, only two of the bobbins 34 are illustrated to avoid confusion which would result from the showing of a multiplicity of identical parts but the manner in which they are disposed in a circle can be seen in FIG. 3. The bobbins 34 are supported on arms 38 which extend radially outwardly from a central cylinder 40 supported on and rotatable with a shaft 42. One strand from each bobbin is led through a perforation in a guide disc 44 also rotatable with the shaft 42 thence through a tensioning device 46, ten of which are equally spaced and extend radially from a hub 48 on the shaft 42. These tensioning devices are of conventional construction and include springs 50 for urging one small disc toward another to impart slight frictional resistance to the passage of the strand between the discs. Each strand then passes through a perforation or eyelet 52 in a hook shaped projection 54 best shown in FIG. 3, ten of which project from the periphery of a spreading disc 56 also secured to and rotatable with the shaft 42 and with the respective bobbins 34.

At opposite sides of the spreading disc and disposed at right angles thereto are a pair of hook discs 58 and 60, each carrying a plurality of hooks 62 and 64, respectively and mounted on a common shaft 66 for rotation in unison. The function of the spreader disc 56 is to spread the strands passing through it from side to side and lace them between the hooks 64 and 62 on the two hook discs. This is accomplished in the manner schematically illustrated in FIG. 4 where a portion of the web 16 is illustrated after it is passed between the pincher roll 20 and the drum 12 but with the web 14 which covers it removed. The pattern of the strands between the webs is illustrated and a single strand 70 is extended back over one of the hooks 64 and one of the hooks 62. The direction of rotation of the disc 56 is counterclockwise as viewed in FIG. 4 and the hook-like portions 54 of the disc pass between the hooks 64 on the disc 60 and the hooks 62 on the disc 58 as they rotate also in a counterclockwise direction as they are viewed in FIG. 2 so that the hooks as viewed in FIG. 4 may be said to be rotating upwardly and away from the viewer. When the hook 54 through which the strand 70 passes in FIG. 4 passed the disc 60, the hook 64 was at the bottom of the disc and intercepted the strand 70 to carry it forwardly and upwardly to the position illustrated during which time the same strand 70 was carried to the left, around an arc described by the eyelet through which it passes in the hook 54, until the strand was again intercepted by the hook 62 at the bottom of the disc 58. Since this is a continuous motion, the strand is constantly arranged in a zig-zag pattern and since there are many strands and many hooks on the discs 58 and 60, the pattern of multiple diagonal strands which overlie the web 16 is being continuously formed and fed between the two webs as they enter the nip of the pincher rollers 12 and 20. Such nip is located substantially in alignment with the path of circular movement of the hook elements. As a result, the pincher rolls 12 and 20 cooperate in stripping the strand pattern from the hooks 62 and 64 and retain it against disarrangement when the support of the hooks over which it has been laced has been removed.

The ends of the diagonal strands in the pattern extend beyond the edges of the webs 14 and 16 forming small loops as shown in FIG. 4 and these loops may be trimmed off before the web is used. They serve the useful purpose during fabrication of the reinforced web of visibly indicating the breakage or entanglement of any strand which might interrupt the uniformity of the pattern. Also, since a large machine may be employed for forming a very wide reinforced web which may later be cut into strips to form tapes, the elimination of these protruding loops is necessary only at the opposite edges of the wide web. As is apparent in FIGS. 2 and 3, the hooks 62 on the disc 58 have their hooked portions or tines projecting in a tangential or circumferential direction and the tines of hooks 64 on the disc 60 project radially as is apparent from FIGS. 1 and 3. This positioning of the hooks has been found most suitable for their engagement with the moving strands passing between them and also enables the strands to be easily stripped from the hooks as the pattern formed by the strands passes between the webs between the main drum 12 and a pinching roller 20. Longitudinal strands shown as 6 in number at 72 in FIG. 4 are also layed between the webs and these strands originate from the bobbins 36 arranged in a straight line as shown, and each feeding strand is also shown at 72 in FIG. 2 through a tensioning device 74, like those shown at 46, and then directly to the point where the webs 14 and 16 are brought together.

The machine is driven by a power source such as an electric motor, not shown, through a chain 76 and a sprocket 78 rotating a main gear 80 meshing with and driving a gear 82 on the shaft 42. A second gear 84 meshes with the gear 80 and drives a countershaft 86 with a bevel pinion 88 thereon, meshing with a bevel gear 89 on the shaft 66 which drives the hook discs 58 and 60. This shaft 66 also carrier a gear 90 meshing with a gear 92 on a shaft 94 which supports and rotates the main drum 12.

Through the construction illustrated, a smooth, continuous and rapid operation effects uninterrupted fabrication of reinforced tape or web material in an inexpensive manner.

I claim:

1. The method of fabricating a reinforced web which comprises providing spaced apart parallel rigid means rotatable about a common fixed axis in a circular path and having circularly arranged hook elements to arrange a plurality of reinforcing strands in a zig-zag pattern by lacing them back and forth between such hook elements, simultaneously rotating a plurality of bobbins of such strands about an axis extending transversely with respect to said common axis for supplying the strands to the hook elements, providing a pair of cooperating pincher rollers mounted for rotation about axes substantially parallel to said common axis, the nip of which is located in the path of said lacing to strip the strands from said hook elements, and simultaneously feeding a web between said pincher rollers whereby the strands are laid onto said web after they are stripped from said hook elements.

2. In a machine for arranging a plurality of strands in zig-zag pattern and laying them onto a web, a pair of spaced apart parallel substantially rigid rotatable disc members facing each other and rotatable about a common axis, a set of spaced apart hook elements on each rotatable member arranged substantially in a circle about the axis of rotation thereof, means for rotating said members, strand guide means located between said rotatable members rotatable about an axis transverse to that of said rotatable members, said strand guide means carrying a plurality of spaced apart strand guides arranged about the axis of rotation thereof for passing between adjacent hook elements of the respective sets of such elements to lace the strands between said rotatable members, a pair of pincher rolls between said rotatable disc members mounted for rotation about axes substantially parallel to said common axis whereby the axes of rotation of said pincher rolls and said rotatable disc members are substantially parallel, the nip of said pincher rolls being located substantially in alignment with the path of movement of said hook elements to strip the strands from said elements, means for feeding a web between said pincher rolls whereby the strands are laid onto said web as they are stripped by said pincher rolls, and means for rotating said guide means in timed relationship with said rotatable members.

3. In a machine for arranging a plurality of strands in zig-zag pattern and laying them onto a web, a pair of spaced apart parallel substantially rigid discs facing each other, means mounting said discs for rotation about a common substantially fixed axis, a set of spaced apart hook elements on each disc arranged substantially in a circle about the axis of rotation of the disc, a pair of pincher rollers located between said discs and mounted for rotation about axes substantially parallel to said common axis whereby the axes of rotation of said pincher rollers and said discs are substantially parallel, the nip of said rollers being substantially in alignment with the path of circular movement of said hook elements to strip the strands from said elements, strand guide means located between said discs and mounted for rotation about an axis transverse to said common axis, said strand guide means carrying a plurality of spaced apart strand guides arranged about the axis of rotation thereof for passing between adjacent hook elements of the respective sets of such elements to lace the strands between said discs.

4. In a machine for arranging a plurality of strands in zig-zag pattern and laying them onto a web, a pair of spaced apart parallel substantially rigid discs facing each other, means mounting said discs for rotation about a common substantially fixed axis, a set of spaced apart hook elements on each disc arranged substantially in a circle about the axis of rotation of the disc, a pair of pincher rollers located between said discs and mounted for rotation about axes substantially parallel to said common axis whereby the axes of rotation of said pincher rollers and discs are substantially parallel, the nip of said rollers being substantially in alignment with the path of circular movement of said hook elements to strip the strands from said elements, strand guide means located between said discs and mounted for rotation about an axis transverse to said common axis, said strand guide means carrying a plurality of spaced apart strand guides arranged about the axis of rotation thereof for passing between adjacent hook elements of the respective sets of such elements to lace the strands between said discs, means for feeding a web between said pincher rolls whereby the strands are laid onto said web as they are stripped from said hook elements, and means for rotating said guide means in timed relationship with said rotatable members.

References Cited in the file of this patent

UNITED STATES PATENTS

| | | |
|---|---|---|
| 1,015,174 | Gueffroy | Jan. 16, 1912 |
| 1,460,949 | Currier | July 3, 1923 |
| 2,000,643 | Morton | May 7, 1935 |
| 2,548,467 | Crise | Apr. 10, 1951 |
| 2,812,797 | Estee et al. | Nov. 12, 1957 |
| 2,954,817 | Havemann | Oct. 4, 1960 |
| 3,000,432 | Olken | Sept. 19, 1961 |

FOREIGN PATENTS

| | | |
|---|---|---|
| 501,904 | France | Feb. 7, 1920 |